July 14, 1925.

N. KOMOW ET AL 1,545,835

MACHINE FOR CUTTING OUT DISKS

Original Filed Nov. 5, 1920    2 Sheets-Sheet 1

Inventors
Nicolas Komow and
Albert P. Komow
By their Attorney

July 14, 1925.
N. KOMOW ET AL
1,545,835
MACHINE FOR CUTTING OUT DISKS
Original Filed Nov. 5, 1920    2 Sheets-Sheet 2
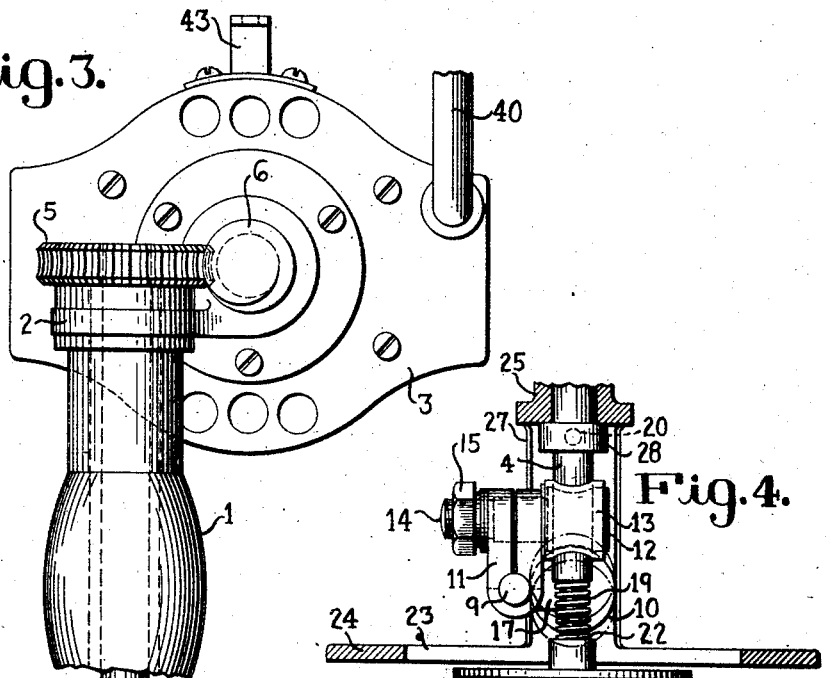
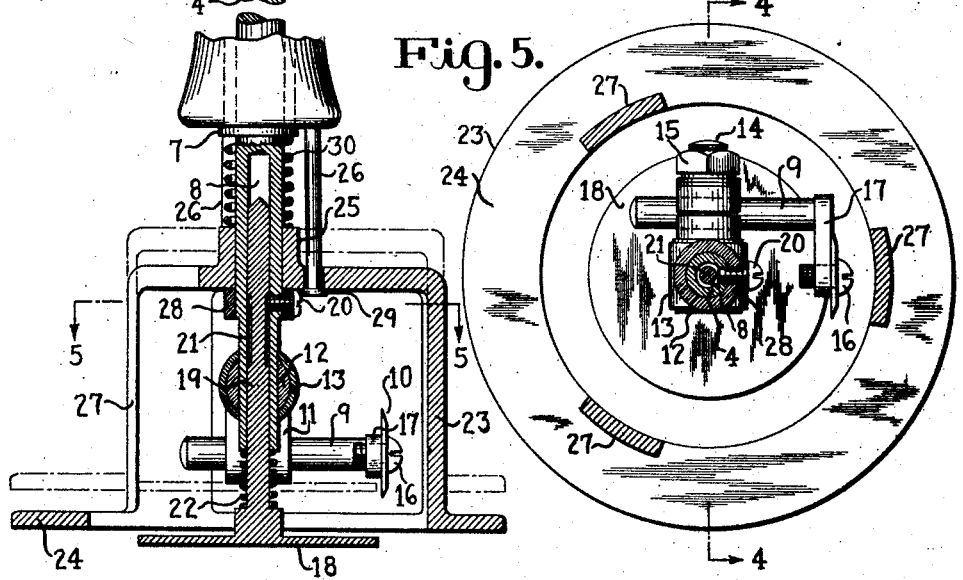

Patented July 14, 1925.

1,545,835

UNITED STATES PATENT OFFICE.

NICOLAS KOMOW AND ALBERT P. KOMOW, OF BROOKLYN, NEW YORK, ASSIGNORS TO UNITED STATES CLOTH CUTTING MACHINE CO., INC., OF NEW YORK, N. Y., A CORPORATION OF NEW YORK.

MACHINE FOR CUTTING OUT DISKS.

Application filed November 5, 1920, Serial No. 421,887. Renewed May 19, 1925.

*To all whom it may concern:*

Be it known that we, NICOLAS KOMOW and ALBERT P. KOMOW, citizens of the United States, and residents of the borough of Brooklyn, in the county of Kings and city and State of New York, have invented a new and useful Machine for Cutting Out Disks, of which the following is a specification.

The invention has for its object to provide an efficient mechanical device for cutting disks out of flat material and more particularly fur material, and comprises the novel machine and combinations of parts and mechanism herein illustrated in preferred embodiment.

In the accompanying drawings forming a part hereof:

Fig. 3 is a view of the machine alone on a larger scale, partly in elevation and partly in central vertical section, and with an intermediate portion of the handle and shaft broken away, dotted lines being used to indicate the relation of the knife and presser members when the machine is cutting;

Fig. 4 is a fragmentary vertical sectional view on a still larger scale, looking to the right in Fig. 3; and Fig. 5 is a horizontal section on the line 5—5 of Fig. 3, on the same scale as Fig. 4.

Figure 1:
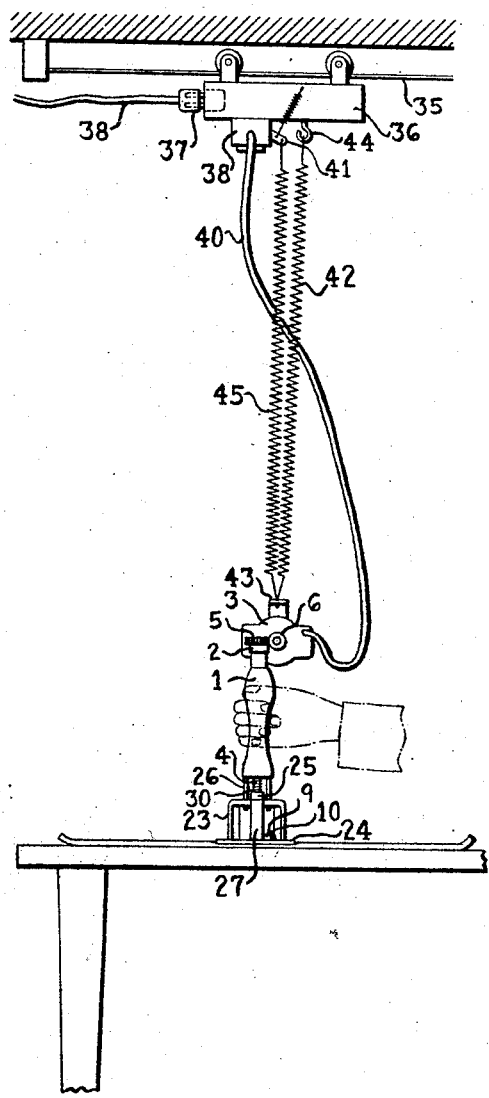
Fig. 1 is an elevation of the present preferred form of the machine, and the means whereby it is resiliently and movably supported and electrically controlled, the machine being shown operating on the material.

The machine as illustrated has a vertical handle or grip 1, which is united at its upper end by a suitable bracket 2 with the frame of an electric motor 3, the motor being carried by the handle. Through the non-rotary handle passes a vertical rotary shaft 4, having a worm-wheel 5 on its upper end in mesh with a worm 6 on the end of the armature shaft of the motor. The shaft is confined against vertical movement relative to the handle, as by means of the worm-wheel and a collar or shoulder 7.

The rotary shaft extends downward below the handle, and its lower portion is cylindrically hollowed as shown at 8. At or near its lower end the shaft carries a laterally or horizontally extending knife-arm 9, on the outer end of which is a vertically disposed knife 10, which when the shaft rotates describes a circle about the vertical axis. The disk-cutter thus constituted is adjustable for cutting disks of different diameters, and is also vertically adjustable. In the particular construction, the arm proper is a cylindrical rod which is slidably and rotatably clamped in a downwardly-projecting-resilient split clamp 11 on a bracket fixed to the shaft. The said bracket, in addition to the clamp 11, may comprise two telescopic members 12, 13 having vertical openings through which the shaft passes, the inner member 12 being continued laterally as a stud 14, on which the clamp 11 is placed, by means of horizontal openings through the upper portions of the limbs of this member. A nut 15 screwed on the outer end of the stud draws the member 12 in one direction against the shaft, clamps the clamp 11 to the outer member 13, tightens said clamp against the arm 9, and forces the member 13 in turn against the shaft, in the opposite direction to that in which the member 12 is drawn, whereby all the parts are locked together. Loosening the nut enables the knife-arm to be moved lengthwise to vary the radius, or to be turned about its axis, whereby the knife is adjusted up or down as indicated by dotted lines in Fig. 4; and in addition the bracket can be moved up or down as a whole and locked. Details may, however, be varied. The knife is preferably circular, clamped by a screw 16 to an offset knife-bearer 17 on the end of the arm in such position that the knife is substantially tangent to the circle to be cut. As the knife wears it can be turned from time to time to bring a fresh portion of its edge into action, the screw 16 being loosened and tightened for the purpose.

Figure 2:
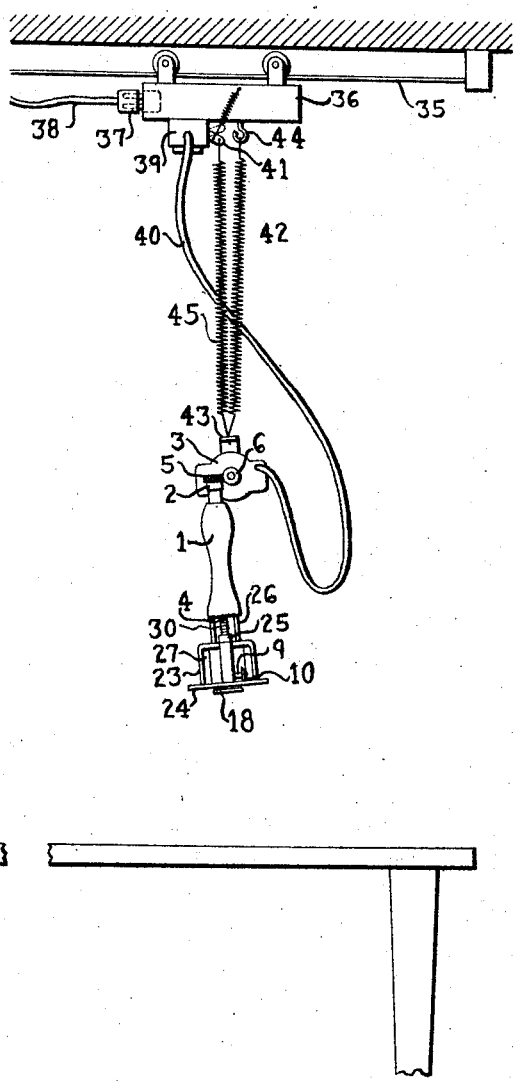
Fig. 2 is a similar view, showing the machine suspended off the material, dotted lines being used to indicate the "off" condition of the switch.

A presser disk 18 holds the material while the knife and disk cuts around it, the knife and disk being relatively vertically yieldable, with the knife normally relatively raised and the disk relatively depressed, as seen in Figs. 2, 3 and 4; the construction being such that the presser disk encounters the material first when the machine is applied downwardly against it, the knife being relatively depressed by further downward movement of the handle until it projects below the disk, while the disk is forced with increasing spring pressure against the material. For this purpose, in the illustrated embodiment, the disk is provided with an upwardly projecting cylindrical stem 19 which is received in the hollow of the shaft, wherein it is free to slide vertically, and is also free for relative turning movement, so that the disk will be held stationary by frictional engagement with the material while the shaft rotates. A screw 20 projecting inward through the wall of the shaft into a vertically elongated annular space formed by cylindrically reducing an intermediate portion 21 of the stem retains the disk while permitting the free relative rotary and vertical movements. A spring 22 interposed between the disk and the end of the shaft, which latter is upwardly sustained against the handle, holds the parts yieldingly in, and restores them to, the normal relation, and affords yielding pressure on the disk when the machine is pushed downward against the resistance of the table. The disk is removable by partly withdrawing the screw 20, so that it may be replaced by any one of a number of other disks of different diameters, but all having stems of the same dimensions. Thus, for cutting larger disks or circular openings in the material, a larger presser disk is substituted, and the knife-arm is adjusted to increase its effective length, while the reverse changes are made if smaller disks are to be cut out. Within a certain range the knife-arm can be adjusted longitudinally without changing the presser-disk, but in general it is desirable that the knife operate close to the periphery of the disk.

The material is also held during cutting by a relatively yielding outer member 23, in the form of an inverted cup or cage, adapted to surround the cutter and presser-disk, and having a bottom presser ring flange 24. The knife is normally above the bottom of this member also, and when relatively depressed operates in the annular space between the ring 24 and the disk 18, as will be apparent from Fig. 5. The outer member is preferably formed with a top hub 25 which has slidable bearing on the exterior of the rotary shaft, and is further guided and held against rotation by one or more vertical rods 26 projecting downward from the handle through openings in the tops of the bars 27, or skeleton wall, of the cage. The cage is limited in its relative downward movement either by a collar 28 fastened by the screw 20 on the shaft or by heads 29 on the lower ends of said rods. A spring 30 interposed between the top of the cage and the handle performs functions similar to those of the spring 22. The cage, in addition to holding the material outside the circular line of cut, also serves as a guard for the knife.

Means are thus provided whereby depression of the handle, relatively to the bottom or presser part of the machine resting on the work, causes the normally relatively raised knife to descend into the material while the presser members apply yielding holding pressure thereto, and whereby subsequent upward movement of the handle causes the knife to rise away from the material while the latter is still held. In this operation the springs 22 and 30 constitute yielding spring means acting between the handle and the presser part. The bottom or presser part of the machine as illustrated comprises the two inner and outer members 18 and 23 (or 24), which may be separately mounted as shown.

The relations may be such that the inner member is normally below the outer member, and a capacity of the two parts for relative vertical movement as between themselves is an advantage; but it is to be understood that we do not limit ourselves to the precise construction, as numerous other forms may be devised.

Means are also provided for suspending the machine and for enabling it to be moved about over the work. Figs. 1 and 2 illustrate an overhead wire or track 35, on which a wheeled traveler 36 can move back and forth. This traveler is adapted to receive a connection 37 on the end of an electrical cable 38, and contains connections therefrom to a snap switch 39, from which conductors pass in the form of a cable 40 to the motor 3, to supply the same with current. The operating member of the switch is represented by a rocking arm 41, which owing to the resilient snap action means of the switch is impositively locked in each of its "on" and "off" positions. The nature of such switches being well understood, the construction does not require special illustration. The machine is hung by a flexible spring suspension member 42 capable of elongating and contracting, one end of the spring being fastened to a lug 43 on the motor and the other end to a hook 44 on the overhead traveler, and is additionally supported by another spring 45 fastened like the spring 42 to the motor, but at its upper end being connected to the switch arm 41. By these springs the machine will be supported in the air above the work table as seen in Fig. 2, in such manner that it can be readily brought down upon the material when it is desired to cut. Part of the weight of the machine hanging free is sustained by the switch member, and this in addition to the impositive locking action of the switch will hold the latter in its on condition, assuming it to be on, against the tension of a further spring 42, which is strong enough to throw the switch to its off condition, if the weight hanging from it be reduced or removed, by lifting the machine. In that case the switch will be automatically thrown to "off", and will remain in that condition when the weight is allowed to hang again. Thus, when the machine is supported off the work, it can be left running or not as desired. If not running, the switch will be automatically thrown on by the increased tension on the connection 45 when the machine is grasped and moved downward.

What we claim as new is:

1. A portable machine for cutting out disks, comprising a handle part having a downwardly extending hollow rotary shaft, a cutter carried thereby, a presser disk having a cylindrical stem longitudinally slidably held in the shaft and permitting the shaft to rotate relatively to the presser disk, a spring interposed between the disk and shaft, an outside frame also adapted to bear on the work and vertically slidably connected with the handle part, and a spring interposed between said frame and the handle part.

2. The combination with an electrically-driven hand cutting machine, of an overhead switch controlling the machine, resilient hanging means adapted to support the machine off the work surface, resilient means whereby the weight of the machine when hanging is applied partly to the operating member of the switch, tending to hold the switch in the "on" condition, and means tending to operate the switch to the "off" condition, the switch being adapted to remain either "on" or "off" under the weight of the machine.

NICOLAS KOMOW.
ALBERT P. KOMOW.